United States Patent
Egner et al.

(10) Patent No.: US 10,194,320 B1
(45) Date of Patent: *Jan. 29, 2019

(54) METHOD AND APPARATUS FOR ASSIGNMENT OF SUBSCRIPTION ELECTRONIC SIM CREDENTIALS VIA LOCAL SERVICE BROKERS

(71) Applicant: Dell Products, LP, Round Rock, TX (US)

(72) Inventors: Will A. Egner, Cedar Park, TX (US); Liam B. Quinn, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/663,769

(22) Filed: Jul. 30, 2017

(51) Int. Cl.
*H04W 24/02* (2009.01)
*H04W 12/08* (2009.01)
(Continued)

(52) U.S. Cl.
CPC .......... *H04W 12/08* (2013.01); *G06Q 20/065* (2013.01); *H04L 9/0819* (2013.01);
(Continued)

(58) Field of Classification Search
CPC ....... H04W 12/06; H04W 4/60; H04W 8/183; H04W 88/06; H04W 4/50; H04W 8/205; H04W 12/04; H04W 12/12; H04W 8/265; H04W 12/08; H04W 48/18; H04W 8/18; H04W 88/16; H04W 8/245; H04W 52/0212; H04W 84/12; G06Q 20/322; G06Q 20/325; G06Q 20/3229; G06Q 20/3255; G06Q 20/40; G06Q 20/20; G06Q 30/06; G06Q 20/16; G06Q 20/342; G06Q 20/3829; G06Q 20/4014; G06Q 30/04; G06Q 30/0601; G06Q 20/34;
(Continued)

(56) References Cited

U.S. PATENT DOCUMENTS

| | | |
|---|---|---|
| 8,768,618 B1 | 7/2014 | Christie |
| 9,137,324 B2 | 9/2015 | Ims |
| 9,374,678 B2 | 6/2016 | Gupta |
| 9,459,339 B2 | 10/2016 | Mansour |
| 9,674,880 B1 * | 6/2017 | Egner .................. H04W 4/029 |
| 9,756,547 B2 * | 9/2017 | Egner .................. H04W 40/10 |
| 2005/0166041 A1 | 7/2005 | Brown |
| 2008/0051062 A1 * | 2/2008 | Lee ..................... H04L 63/0853 455/411 |
| 2011/0151839 A1 * | 6/2011 | Bolon .................. H04W 24/08 455/414.1 |

(Continued)

*Primary Examiner* — Nimesh Patel
(74) *Attorney, Agent, or Firm* — ProI Intellectual Property Law, PLLC; H. Kenneth ProI

(57) ABSTRACT

An information handling system of a local service broker system operating a subscription electronic SIM assignment system may comprise a memory storing a pool of international mobile subscriber identities for assignment to requesting clients, a network interface device for communication with an authentication server in a wireless communication network, and a processor executing machine readable executable code instructions to receive a transaction history associated with a client information handling system. If the transaction history meets a threshold trust requirement, the processor may further execute code instructions to assign one of the pool of international mobile subscriber identities to the client information handling system, generate variables for determination of electronic SIM credentials, determine one or more electronic SIM credentials, and transmit the assigned international mobile subscriber identity and variables for determination of electronic SIM credentials to the client information handling system.

20 Claims, 6 Drawing Sheets

(51) Int. Cl.
  *H04W 12/06*  (2009.01)
  *H04L 29/06*  (2006.01)
  *H04W 12/02*  (2009.01)
  *G06Q 20/06*  (2012.01)
  *H04L 9/08*  (2006.01)
  *H04W 8/18*  (2009.01)

(52) U.S. Cl.
  CPC ........ *H04L 63/0853* (2013.01); *H04L 63/108* (2013.01); *H04W 8/183* (2013.01); *H04W 12/02* (2013.01); *H04W 12/06* (2013.01)

(58) Field of Classification Search
  CPC ............. G06Q 20/3823; G06Q 20/401; G06Q 20/065; G06Q 30/0633; G06Q 30/0635; G06Q 30/0641; G06Q 20/12; G06Q 2220/00; G06Q 20/027; G06Q 20/223; G06Q 20/24; G06Q 20/341; G06Q 20/347; G06Q 20/35
  See application file for complete search history.

(56) References Cited

U.S. PATENT DOCUMENTS

| | | | |
|---|---|---|---|
| 2012/0108204 A1* | 5/2012 | Schell | H04W 8/205 455/411 |
| 2012/0282924 A1* | 11/2012 | Tagg | H04W 60/06 455/432.1 |
| 2013/0031240 A1 | 1/2013 | Byzek | |
| 2014/0263627 A1* | 9/2014 | Wyatt | G07F 19/00 235/380 |
| 2014/0368386 A1 | 12/2014 | Mansour | |
| 2015/0249907 A1 | 9/2015 | Gupta | |
| 2016/0057124 A1 | 2/2016 | Boyle | |
| 2016/0203485 A1* | 7/2016 | Subramanian | G06Q 30/00 705/44 |
| 2016/0283920 A1 | 9/2016 | Fisher | |
| 2017/0064037 A1 | 3/2017 | Das | |
| 2017/0109685 A1 | 4/2017 | Bianchi | |
| 2017/0374541 A1* | 12/2017 | Tate | H04W 8/06 |

* cited by examiner

| Time | Access Attempt No. 1 | Access Attempt No. 2 | Access Attempt No. 3 |
|---|---|---|---|
| MAC Address | 00-14-22-01-23-45 | 00-04-DC-01-23-45 | 00-14-22-01-23-45 |
| Time of Access | 08/01/17 17:42:16 | 08/08/17 15:24:16 | 08/24/17 07:16 |
| Network Type Accessed | Wi-Fi | LTE | Unlicensed WPAN |
| IMSI Used for Access | 520030123456789 | 310150901234578 | 460001234567890 |
| Access Location (GPS) | 13.7563, 100.5018 | 30.2672, 97.7431 | 39.9042, 116.4074 |
| Payment Successful? | Y | N | N |
| Access Successful? | Y | N | Y |
| Security Flag? | None | MAC Address Mismatch | Payment Unsuccessful |

Transaction History Block Chain 302

FIG. 3

METHOD AND APPARATUS FOR ASSIGNMENT OF SUBSCRIPTION ELECTRONIC SIM CREDENTIALS VIA LOCAL SERVICE BROKERS

FIELD OF THE DISCLOSURE

The present disclosure generally relates to managing security and availability of data accessed by information handling systems via mobile edge-computing systems, and more specifically to assignment of subscription electronic subscriber identification module (SIM) credentials to devices without SIM cards via local service brokers.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include security capabilities for identifying and inhibiting access by unauthorized clients.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a graphic diagram of a table illustrating a wireless transaction history block chain according to an embodiment of the present disclosure;

The use of the same reference symbols in different drawings may indicate similar or identical items.

DETAILED DESCRIPTION OF THE DRAWINGS

Figure 1:
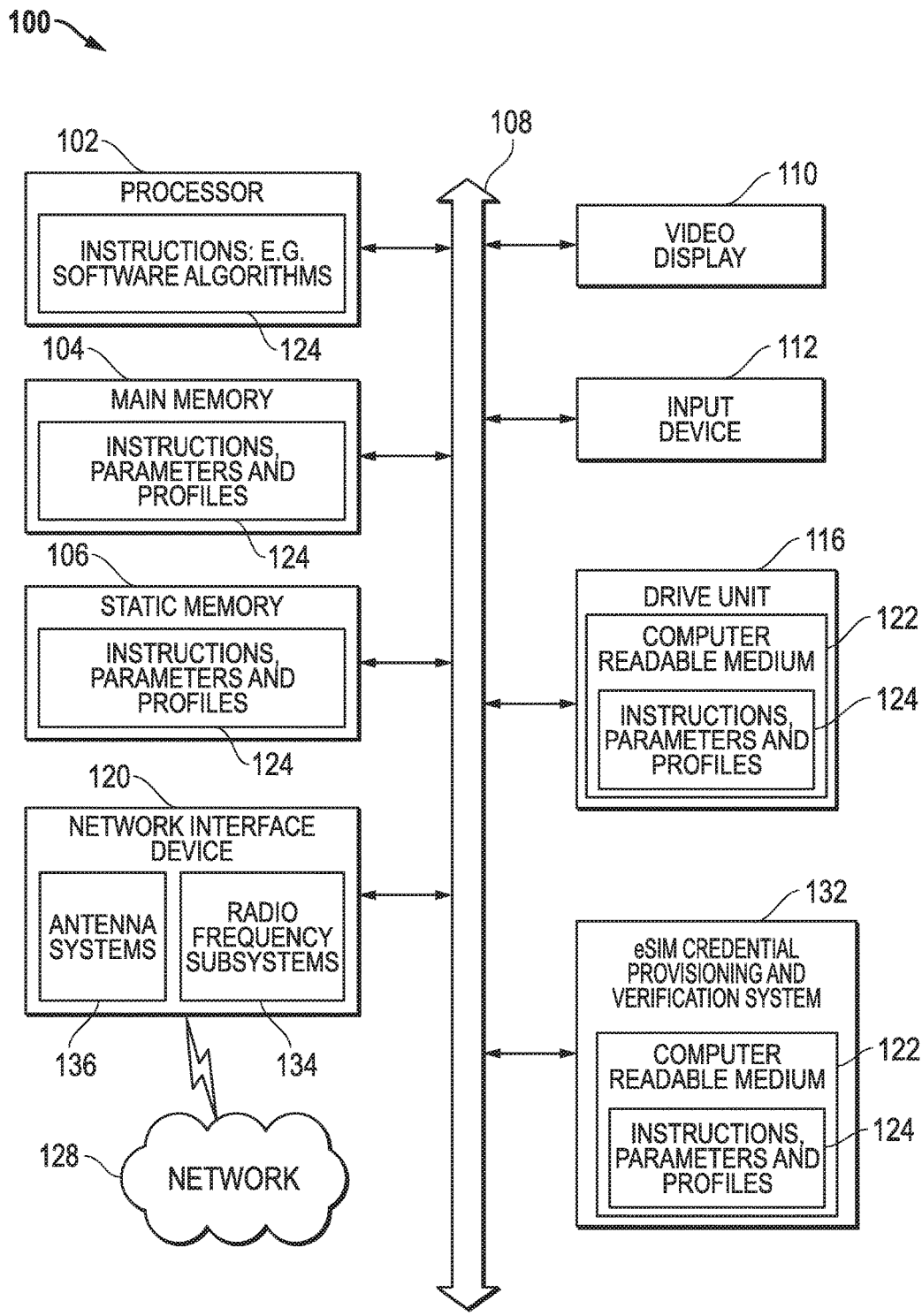
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, tasks previously completed only on a single, stationary information handling system are now being completed across multiple information handling systems within the internet of things (IoT). For example, a single user, or client may use one or more stationary information handling systems, one or more mobile information handling systems, and one or more IoT information handling systems to form an ecosystem of devices for that single client. Consistent communication across each information handling system within a client's ecosystem of devices in such a scenario is essential to completing tasks distributed across several devices within the ecosystem. However, there is a competing need to keep these multiple information handling systems lightweight, and to decrease the computing overhead for these devices. One solution to these contrasting needs is to allow each of the information handling systems within a client's ecosystem to communicate via any communication infrastructure available, without adding unnecessary hardware components.

Different communication infrastructures require differing forms of hardware and software in order to communicate with information handling systems attempting to access the communication network. For example, cellular communication infrastructures, such as 2G, 3G, 4G, 5G, Wi-Max, and LTE all require information handling systems communicating according to these standards to include a subscriber identity module (SIM card). The SIM card in information handling systems communicating according to current and developing cellular standards tracks the identity of the device accessing the cellular network. Identification of each device accessing the cellular network is a requirement of United States Copyright laws, in order to avoid penalties for misuse of the internet.

Cellular information handling systems (e.g. smart phones) incorporate SIM cards in the manufacturing stage of the device, but other information handling systems within a client's ecosystem of devices may not include a SIM card upon manufacture and sale of the device (e.g. laptop computers, tablet computers, IoT sensors). A solution is needed to allow these devices manufactured without SIM cards within the client's ecosystem of devices to access the cellular networks without addition of extra hardware such as a SIM card, keeping each of the devices in a client's ecosystem as slim and lightweight as possible, while allowing them access to 2G, 3G, 4G, 5G, Wi-MAX, and LTE wireless networks.

Embodiments of the present disclosure provide a solution to this problem in the form of an eSIM credential provisioning and verification system. Electronic SIM (eSIM) modules in embodiments of the present disclosure may operate onboard client information handling systems not including SIM cards, and may operate to generate eSIM credentials based on variables received from a local service broker operating at a an access point within a cellular network. The local service broker in some embodiments may operate within an enterprise network to which the client information handling system belongs. The eSIM credential provisioning and verification system in embodiments of the present disclosure may operate partially onboard each information handling system within a client's ecosystem that does not include a SIM card, within a local service broker operating within a local or enterprise network, and/or within an authentication server (e.g. home subscriber server) located remotely from the client information handling system and the local service broker.

A local service broker in embodiments of the present disclosure may have access to a pool of available international mobile subscriber identities (IMSI) that may be checked out and assigned to paying subscriber client information handling systems in order to provide the identification required by copyright laws. Upon payment by a trusted client information handling system, a local service broker in embodiments of the present disclosure may generate variables usually stored on an information handling system's SIM card and may use those variables to calculate a plurality of eSIM credentials used for later verification of the information handling system's identity. In embodiments of the present disclosure, the local service broker may assign these variables and eSIM credentials to one of the IMSI's available for assignment, transmit the chosen IMSI and eSIM credentials to the authentication server, and receive a response indicating the authentication server has associated the chosen IMSI with the received eSIM credentials. The local service broker in embodiments of the present disclosure may then transmit the variables used to generate the eSIM credentials, and the chosen IMSI to the paying subscriber client information handling system.

The local service broker in embodiments of the present disclosure may only assign an IMSI and transmit variables used to generate eSIM credentials to client information handling systems with a trusted track record of successful payment and lack of security issues. Each subscribing client information handling system in an embodiment may store a block-chain data record describing each previous attempt to access any given cellular network. For example, such a block chain may include a plurality of blocks, each describing a single attempt to access a cellular network, including the media access control (MAC) address of the client information handling system requesting access, time of access, the type of network accessed (e.g. Wi-Fi, LTE, Wi-gig), the IMSI assigned to the client information handling system and used to gain access, the access location, whether payment for that access was successful, whether the access was successful, and whether/which security flags are associated with the requesting client information handling system. Example security flags that may be associated with client information handling systems in embodiments of the present disclosure may include multiple MAC addresses used to describe the same client information handling system, failure to complete payment for an access session, or failure to successfully access a network. The client information handling system in embodiments of the present disclosure may transmit this block-chain to the local service broker along with a request for a new IMSI assignment, and the local service broker may grant or deny this request based on its analysis of the client information handling system's wireless transaction history.

In embodiments in which the local service broker assigns the client information handling system the requested IMSI, the client information handling system may later request access to a network. In one example embodiment, the client information handling system may request access to the enterprise network including the local service broker. In such an embodiment, the client information handling system may request access to the enterprise network via the local service broker operating at a wireless network access point including transceiving capabilities, or via the authentication server. In order to access the enterprise network, the eSIM module operating within the client information handling system in embodiments of the present disclosure may use the variables received from the local service broker to calculate the eSIM credentials, and transmit those eSIM credentials and the IMSI it received from the local service broker back to the local service broker of the enterprise network or directly to the authentication server. Either the local service broker or the authentication server in such embodiments may then compare the eSIM credentials and IMSI received from the client information handling system with the eSIM credentials associated with that IMSI in storage at both the local service broker and the authentication server. If the credentials match, the local service broker or the authentication server (whichever received the eSIM credentials and IMSI from the client information handling system) in embodiments of the present disclosure may then grant the client information handling system access to the enterprise network. Conversely, if the credentials do not match, the local service broker or the authentication server (whichever received the eSIM credentials and IMSI from the client information handling system) in embodiments of the present disclosure may then deny the client information handling system access to the enterprise network.

In a second example embodiment, the client information handling system may request access to a roaming network not including the local service broker. In such an embodiment, the client information handling system may request access to the roaming network via a mobile edge-compute system operating at a wireless network access point including transceiving capabilities, or via the authentication server. In order to access the roaming network, the eSIM module operating within the client information handling system in embodiments of the present disclosure may use the variables received from the local service broker to calculate the eSIM credentials, and transmit those eSIM credentials and the IMSI it received from the local service broker to the MEC of the roaming network or directly to the authentication server. If the client information handling system transmits the eSIM credentials to the MEC in embodiments of the present disclosure, the MEC may then transmit the client-calculated eSIM credentials and IMSI to the authentication server for verification that the client information handling system is a valid subscriber. The authentication server in embodiments of the present disclosure may then locate the client-transmitted IMSI, identify the eSIM credentials associated with that IMSI at the authentication server, and compare the stored eSIM credentials against the eSIM credentials received from the client information handling system.

If the credentials match, the authentication server in embodiments of the present disclosure may either transmit a verification notification to the MEC, which may then grant the client information handling system access to the roaming network, or the authentication server may directly grant the client information handling system access to the roaming network. Conversely, if the credentials do not match, the authentication server in embodiments of the present disclosure may either transmit a notification indicating the client information handling system identity could not be identified to the MEC, which may then deny the client information handling system access to the roaming network, or the authentication server may directly deny the client information handling system access to the roaming network. The eSIM credential provisioning and verification system in embodiments of the present disclosure thus allows subscribing client information handling systems manufactured without SIM cards within the client's ecosystem of devices to access cellular networks without addition of extra hardware such as a SIM card, keeping each of the devices in a client's ecosystem as slim and lightweight as possible.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

FIG. 1 shows an information handling system 100 capable of administering each of the specific embodiments of the present disclosure. For example, the information handling system 100 can represent a mobile edge-compute system (MEC) operating as wireless network access point or a local service broker located anywhere within a network of access points or may also represent aspects of a mobile information handling system in communication with the gateway device, or an authentication server in communication with the MEC or local service broker. The phrase mobile edge-compute system (MEC) as used in the present disclosure may include any wireless network access point including transceiving capabilities, and may or may not include computing capabilities. For example, a MEC in embodiments of the present disclosure may include a gateway device, a mobile edge-compute system with onboard compute capabilities, or a mobile edge-compute system with onboard compute capabilities co-located with a gateway device. A MEC or local service broker, and/or an authentication server may execute instructions via a processor for an eSIM credential provisioning and verification system according to embodiments disclosed herein. The eSIM credential provisioning and verification system of various embodiments of the present disclosure may operate in some example embodiments as a software agent, in whole or in part, within a MEC or local service broker or other wireless network access point while other portions of the eSIM credential provisioning and verification system may operate on remote authentication server systems or within client information handling systems operating within the same network as the MEC or local service broker. Information handling system 100 may also represent a networked server or other system and administer some or all aspects of the eSIM credential provisioning and verification system via instructions executed on a processor according to various embodiments herein involving remote operation of such systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the eSIM credential provisioning and verification system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input, and a GPS location circuit 114 capable of measuring a geographic location in three-dimensions, a velocity, and an acceleration of a mobile, semi-mobile, and/or stationary information handling system. The information handling system 100 can also include a disk drive unit 116.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 134 with transmitter/receiver circuitry, wireless controller circuitry, amplifiers and other circuitry for wireless communications. The wireless adapter 120 may also include antenna system 136 which may be tunable antenna systems for use with the system and methods disclosed herein. The radio frequency subsystems 134 include wireless controllers to manage authentication, connectivity, communications, power levels for transmission, buffering, error correction, baseband processing, and other functions of the wireless adapter 120.

The information handling system 100 can include a set of instructions 124 that can be executed to cause the computer system to perform any one or more of the methods or computer based functions disclosed herein. For example, instructions 124 may execute an eSIM credential provisioning and verification system, software agents, or other aspects or components. Similarly instructions 124 may execute the eSIM credential provisioning and verification system disclosed herein for generating variables used to determine one or more eSIM credentials, calculating the one or more eSIM credentials using the generated variables, associating the eSIM credentials with an IMSI within a pool of IMSIs that can be assigned to clients, transmitting the IMSI and variables to a trusted client information handling system, and transmitting a message to an authentication server to associate the IMSI with the eSIM credentials.

Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the eSIM credential provisioning and verification system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including a transaction history block chain and/or a historical trust references block-chain. The disk drive unit 116 and static memory 106 also contain space for data storage. Further, the instructions 124 may embody one or more of the methods or logic as described herein. For example, instructions relating to the eSIM credential provisioning and verification system software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the eSIM credential provisioning and verification system may be executed locally or remotely. For example, portions of the eSIM credential provisioning and verification system may be executed at a mobile edge-computing system while other portions of the eSIM credential provisioning and verification system, such as a local service broker, may be executed at a remotely located authentication server. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The eSIM credential provisioning and verification system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include an eSIM credential provisioning and verification system 132 that may be operably connected to the bus 108. The eSIM credential provisioning and verification system 132 computer readable medium 122 may also contain space for data storage. The eSIM credential provisioning and verification system 132 may perform tasks related to provisioning variables needed to generate eSIM credential to a client information handling system lacking a subscriber identity module (SIM) card. A local service broker operating the eSIM credential provisioning and verification system 132 may reside in a mobile edge-computing system device in communication with an information handling system and with an authentication server. In an embodiment, the authentication server may operate to police access by a plurality of client information handling systems to a network requiring SIM cards for verification of client identification. The memory 104 may store a pool of international mobile subscriber identifications (IMSIs) for assignment to trusted clients, variables used to generate electronic SIM (eSIM) credentials, eSIM credentials calculated using the stored variables, and records associating calculated eSIM credentials with IMSIs assigned to trusted clients.

The local service broker operating the eSIM credential provisioning and verification system 132 residing within a mobile edge-computing system in an embodiment may allow client information handling systems to access networks without the use of a SIM card by provisioning eSIM credentials and IMSIs to client information handling systems that do not contain SIM cards. In doing so, the eSIM credential provisioning and verification system 132 may receive a block chain data record identifying the client information handling system by MAC address. Each block chain may contain a plurality of "blocks," or time-stamped records describing each attempt the client information handling systemhas made to access a communication network, the type of network accessed (e.g. Wi-Fi, LTE, Unlicensed WPAN), the access location, whether the payment for that access attempt was successful and a link to a security and performance history address associated with that client information handling system.

Each subscriber's information handling system may include an eSIM credential provisioning and verification system 132 agent or API that transmits the block chain data record and an encryption key to the local service broker. Upon receiving the encryption key, the local service broker in an embodiment may decrypt the encrypted block chain, and determine whether the payment history and historical trust references located at the link within the block chain associated with the client information handling system meets a threshold trust requirement. If the client information handling system does meet the threshold trust requirement in an embodiment, the MEC may proceed to assign the client information handling system an IMSI, generate the variables used to create the eSIM credentials, and transmit the IMSI and variables to the client information handling system for later use in attempting to access a network requiring SIM credentials.

In an embodiment, the eSIM credential provisioning and verification system 132 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
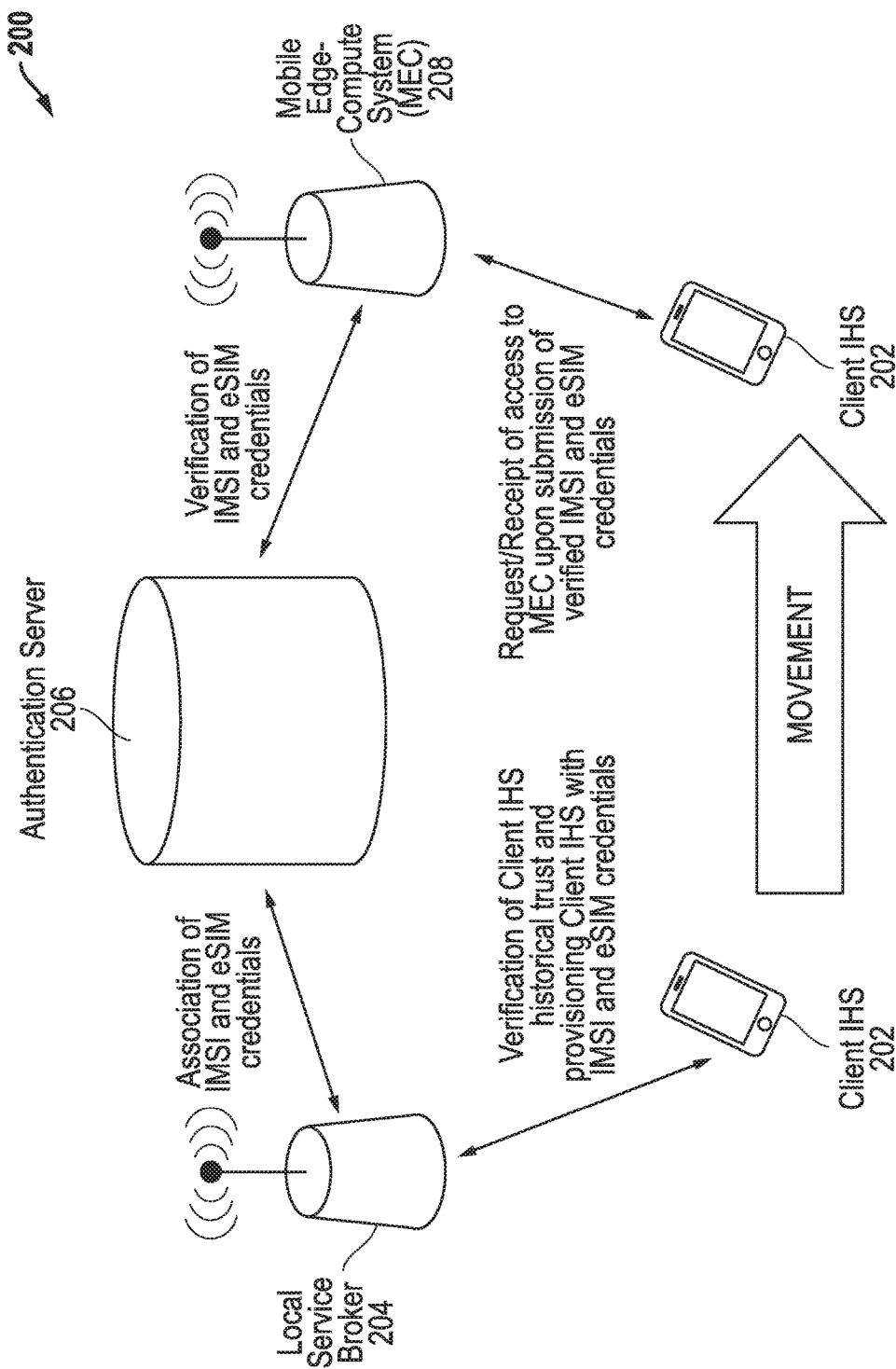
FIG. 2 is a block diagram illustrating a client information handling system using eSIM credentials provisioned from a local service broker to access a wireless network requiring SIM credentials according to an embodiment of the present disclosure.

FIG. 2 is a block diagram illustrating a client information handling system using eSIM credentials provisioned from a local service broker to access a wireless network requiring SIM credentials and lacking a SIM card according to an embodiment of the present disclosure. A network 200 in an embodiment may include one or more client information handling systems. For example, network 200 may include Client IHS 202, a local service broker 204, an authentication server 206 located remotely from the local service broker 204 and the client IHS 202, and a mobile edge-compute system (MEC) 208. In order for the client IHS 202 to access the network 200 via the MEC 208 in the network 200, the MEC 208 may require the client IHS 202 to transmit valid SIM credentials. The local service broker 204 in an embodiment may operate to provision valid electronic SIM (eSIM) credentials in place of the valid subscriber identity module (SIM) credentials to trusted client IHS 202 that do not include SIM cards containing SIM credentials.

Client IHS 202 in an embodiment may be an IoT device, a thin client information handling system, a smartcard, a mobile information handling system, or any other information handling system with wireless access. For example, in an embodiment, the client IHS 202 may be a mobile tablet computer, or an IoT sensor that is not originally manufactured containing a SIM card. The client IHS 202 in an embodiment may operate the eSIM credential provisioning and verification system, or an agent or API for the system to request an ISMI and eSIM credentials from the local service broker 204 for later use accessing the network via MEC 208. As part of the request, the client IHS 202 may transmit a digital cyber security address to the local service broker 204 where the local service broker 204 may access a transaction history block chain associated with the client IHS 202.

The local service broker 204 in an embodiment may operate portions of the eSIM credential provisioning and verification system, and may be located at an access point within network 200, including, at one of the mobile edge compute systems or gateway nodes within network 200. The local service broker 204 in an embodiment may be an access point within an enterprise network to which the client information handling system 202 is a subscriber. The local service broker 204 in an embodiment may store a plurality of international mobile subscriber identifications (IMSIs) that it may assign to trusted client information handling systems. As it assigns IMSIs in an embodiment, it may notify the authentication server 206 of these assignments to allow the authentication server 206 to maintain a valid identification of all information handling systems accessing the network 200. The client information handling system 202 in an embodiment may be capable of communicating directly with the authentication server 206 either from within the enterprise network, or in a roaming network.

The local service broker 204 may execute code instructions of the eSIM credential provisioning and authentication system to determine whether the client IHS 202 requesting an IMSI and eSIM credentials is trustworthy. In doing so, the local service broker 204 in an embodiment may access the transaction history block chain associated with the client IHS 202, and determine, based on past payment history and past trust references associated with the client IHS 202 whether client IHS 202 may be trusted.

If the local service broker 204 executing code instructions of the eSIM credential provisioning and authentication system in an embodiment determines client IHS 202 may be trusted, it may assign one of the pool of IMSIs available to the client IHS 202, generate one or more variables used to determine valid eSIM credentials, and determine the valid eSIM credentials from the one or more generated variables, as described in greater detail below. Because the authentication server 206 in an embodiment performs the function of tracking identification of all information handling systems accessing the network 200, the local service broker 204 may transmit the assigned IMSI, the determined eSIM credentials, and an instruction to associate the assigned IMSI with the determined eSIM credentials in a memory to the authentication server 206 for later use in verifying the identity of client IHS 202. Upon receipt from the authentication server 206 that it has successfully stored the association, the local service broker 204 may transmit the assigned IMSI and the variables used to generate the eSIM credentials to the client IHS 202.

The client IHS 202 in an embodiment may use the variables received from the local service broker 204 to determine the eSIM credentials using the same method as the local service broker 204. At a later time, and possibly after movement of the client IHS 202, the client IHS 202 may attempt to access the network 200 or a roaming network (not shown) using the IMSI received from the local service broker 204 in an embodiment. In one example embodiment, the client information handling system 202 may request access to the enterprise network 200 including the local service broker 204 via the local service broker 204. In such an embodiment, the local service broker 204 may be operating at a wireless network access point including transceiving capabilities. In order to access the enterprise network 200 in such an embodiment, the eSIM module operating within the client information handling system 202 may use the eSIM variables received from the local service broker 204 to calculate the eSIM credentials, and transmit those eSIM credentials and the IMSI it received from the local service broker 204 back to the local service broker 204 of the enterprise network 200. The local service broker 204 in such embodiment may then compare the eSIM credentials and IMSI received from the client information handling system 202 with the eSIM credentials associated with that IMSI in storage at the local service broker 204. If the credentials match, the local service broker 204 in an embodiment may then grant the client information handling system 202 access to the enterprise network 200. Conversely, if the credentials do not match, the local service broker 204 may then deny the client information handling system 202 access to the enterprise network 200.

In a second example embodiment, the client information handling system may request access to the enterprise network 200 including the local service broker 204 via the authentication server 206. In such an embodiment, the client information handling system 202 may request access to the enterprise network 200 via the authentication server 206 operating at a wireless network access point including transceiving capabilities. For example, authentication server 206 may be a home subscriber system (HSS) network allowing access to IMSI authentication from multiple roaming locations. In order to access the enterprise network 200 in such an embodiment, the eSIM module operating within the client information handling system 202 may use the eSIM variables received from the local service broker 204 to calculate the eSIM credentials, and transmit those eSIM credentials and the IMSI it received from the local service broker 204 to the authentication server 206 of the enterprise network 200. The authentication server 206 in such embodiment may then compare the eSIM credentials and IMSI received from the client information handling system 202 with the eSIM credentials associated with that IMSI in storage at the authentication server 206. If the credentials match, the authentication server 206 in an embodiment may then grant the client information handling system 202 access to the enterprise network 200. Conversely, if the credentials do not match, the authentication server 206 may then deny the client information handling system 202 access to the enterprise network 200.

In a third example embodiment, the client information handling system may request access to a roaming network (not shown) not including the local service broker 204 via the authentication server 206. In such an embodiment, the client information handling system 202 may request access to the roaming network via the authentication server 206 operating at a wireless network access point including transceiving capabilities. In order to access the roaming network, the eSIM module operating within the client information handling system 202 in embodiments of the present disclosure may use the variables received from the local service broker 204 to calculate the eSIM credentials, and transmit those eSIM credentials and the IMSI it received from the local service broker 204 to the authentication server 206. The authentication server 206 in embodiments of the present disclosure may then locate the client-transmitted IMSI, identify the eSIM credentials associated with that IMSI at the authentication server 206, and compare the stored eSIM credentials against the eSIM credentials received from the client information handling system 202. If the credentials match, the authentication server 206 in embodiments of the present disclosure may grant the client information handling system 202 access to the roaming network. Conversely, if the credentials do not match, the authentication server 206 in embodiments of the present disclosure may deny the client information handling system 202 access to the roaming network.

In a fourth example embodiment, the client information handling system may request access to a roaming network (not shown) not including the local service broker 204 via the mobile edge-compute (MEC) system 208. As described above, the MEC in an embodiment may include any wireless network access point including transceiving capabilities, and may or may not include computing capabilities. For example, a MEC in embodiments of the present disclosure may include a gateway device, a mobile edge-compute system with onboard compute capabilities, or a mobile edge-compute system with onboard compute capabilities co-located with a gateway device. The MEC 208 in an embodiment may be a separate access point from the local service broker 204. It is understood that a mobile edge computing system may be located near a gateway in some embodiments. MEC resources may include a locally placed computing system or server near one or more access points, base stations, or other edge transmitters making edge computing resources available to a wireless area. In other embodiments, a mobile edge computing system may be co-located as part of a wireless gateway whereby the wireless gateway may provide one option for mobile edge computing services to client information handling systems. MEC 208 in an embodiment may be connected to an internet backbone and cloud network for connection to internet resources or other cloud connected resources. For example, cloud connectivity may be via wired Ethernet connectivity to backhaul connection of the greater internet infrastructure.

In order to access the roaming network, the eSIM module operating within the client information handling system in embodiments of the present disclosure may use the variables received from the local service broker 204 to calculate the eSIM credentials, and transmit those eSIM credentials and the IMSI it received from the local service broker 204 to the MEC 208 of the roaming network. The MEC 208 in an embodiment may then transmit the client-calculated eSIM credentials and IMSI to the authentication server 206 for verification that the client information handling system 202 is a valid subscriber. The authentication server 206 in embodiments of the present disclosure may then locate the client-transmitted IMSI, identify the eSIM credentials associated with that IMSI at the authentication server 206, and compare the stored eSIM credentials against the eSIM credentials received from the client information handling system 202.

If the credentials match, the authentication server 206 in embodiments of the present disclosure may transmit a verification notification to the MEC 208, which may then grant the client information handling system 202 access to the roaming network. Conversely, if the credentials do not match, the authentication server 206 in embodiments of the present disclosure may transmit a notification indicating the client information handling system 202 identity could not be identified to the MEC 208, which may then deny the client information handling system 202 access to the roaming network. The eSIM credential provisioning and verification system in embodiments of the present disclosure thus allows subscribing client information handling systems 202 manufactured without SIM cards within the client's ecosystem of devices to access cellular networks (e.g. enterprise network 200 and/or roaming networks) without addition of extra hardware such as a SIM card, keeping each of the devices in a client's ecosystem as slim and lightweight as possible.

In an embodiment, the client IHS 202 may wirelessly communicate with any of multiple MECs, any of multiple local authentication servers, and any of multiple local service brokers. In some cases, plural wireless links may be used. Wireless communication may be via WWAN connectivity, WLAN connectivity, WPAN connectivity or any other wireless link protocols. For example, authentication server 206, MEC 208 and/or local service broker 204 may be LTE or WCDMA base stations operating in 2G, 2.5G, 3G, 4G, 4.5G, 5G or other 3GPP protocols with client IHS 202. For example, small cell LTE access may be utilized in an enterprise network, but may also be accessible at roaming locations. Client IHS 202 may also have one or more wireless transmitters in some embodiments.

In other embodiments, the authentication server 206, MEC 208 and/or the local service broker 204 may be Wi-Fi or WiGig access points for administering one or more WLAN wireless links with client IHS 202. In further embodiments, low power protocols may be used including 6LoWPAN, ZigBee, or similar WPAN protocols for interface between client IHS 202 that is an IoT device and the authentication server 206, local service broker 204 or MEC 208. Wireless links may be available from the authentication server 206, MEC 208 and/or the local service broker 204 via WLAN which may be connected by wireline or Ethernet connections to a wider external network such as the cloud. For example, wireless network access points may be connected to a wireless network controller and an Ethernet switch. Wireless communications with authentication server 206, local service broker 204 and/or MEC 208 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols. Alternatively, other available wireless links via authentication server 206, local service broker 204 and/or MEC 208 may include macro-cellular connections via one or more service providers. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

FIG. 3 is a graphic diagram of a table illustrating a wireless transaction history block chain associated with a client information handling system media access control (MAC) address according to an embodiment of the present disclosure. A block chain is a distributed database of time-stamped records called "blocks." A block chain grows by adding a plurality of blocks, where each block is linked to the other blocks to form a chain. Each block in a block chain may be added by a different entity or device simply by linking a new block to previously recorded blocks. Because each block links to a previous block, and all blocks may be generated by differing devices, an early block within a block chain cannot be altered retroactively without altering all of the subsequent blocks that later followed and linked to that early block. This makes block chains inherently resistant to modification of each time-stamped record within the chain. A block chain based recording system may make transmission and authentication of data between a plurality of devices quicker, cheaper, and safer than traditional non-distributed systems with a central authentication server that may be hacked.

The transaction history block chain 302 in an embodiment may be stored at a cyber security address, and may be encrypted. In several embodiments described herein, a mobile electronic SIM (eSIM) credential provisioning and verification system may access the transaction history block chain 302 at a cyber security address received from a client information handling system associated with the transaction history block chain 302, and may decode the transaction history block chain 302 using a temporary private encryption key also received from the client information handling system (for example, Base 58 with check encode payload). The wireless transaction history block chain 302 may be encrypted and subsequently decrypted according to a variety of encryption techniques including symmetric or asymmetric encryption.

In one example embodiment, the transaction history block chain 302 may be stored in a block chain at the cyber security address location, or at the authentication server for security reasons. In a particular embodiment, the block chain is a distributed database of time-stamped records called "blocks." A block chain may grow by adding a plurality of blocks, where each block is linked to the other blocks to form a chain. In some aspects the number of blocks may be limited such that at some point a first block is eliminated with a new block added. Each block in a block chain may be added by a different entity or device simply by linking a new block to previously recorded blocks. Because each block links to a previous block, and all blocks may be generated by differing devices, and an early block within a block chain cannot be altered retroactively without altering all of the subsequent blocks that later followed and linked to that early block. This makes block chains inherently resistant to modification of each time-stamped record within the chain. Data miners may be utilized to encrypt the blocks of a block chain to provide algorithmic encryption of data contained therein. This algorithmic encryption of the block chaining may be computationally intensive. Accordingly, block chaining miners may in some aspects be compensated for creating the block chained data. A block chain based recording system may make recording and transmitting transaction history for a plurality of client information handling systems quicker, cheaper, and safer than traditional non-distributed systems with a central authentication server or encryption method that may be hacked.

The wireless transaction history block chain 302 in an embodiment may include a plurality of time-stamped records describing prior accesses made by the client information handling system to any of various types of networks. Each transaction history block chain 302 in an embodiment may be associated with a single client information handling system identified by a MAC address of the client information handling system. Each time-stamped record in an embodiment may include the MAC address of the client information handling system, the time of access, the type of network accessed, the international mobile subscriber identification (IMSI) used by the client information handling system to access the network, the location from which the client information handling system accessed the network, whether payment for the access was successful, whether the access attempt was successful, and whether a security flag has been associated with a client information handling system's access attempt. In some embodiments, block chains may be specific to types of networks, such as a block chain for LTE access history.

The MAC address associated with the client information handling system, as stored within the transaction history block chain 302 in an embodiment should not vary across access attempts. Each information handling system in an embodiment should be associated with a single MAC address, and each transaction history block chain 302 should be associated with a single information handling system. As such, more than one MAC address stored within a transaction history block chain 302 in an embodiment may reflect a security breach in which the client information handling system may be attempting to spoof its identity, or in which an outside party is attempting to insert false records of transaction history into the transaction history block chain 302. For example, as shown in row 304 of FIG. 3, the MAC address for the first and third access attempts match, while the MAC address of the second access attempt does not match.

Any type of network access may be described in the transaction history block chain 302 in an embodiment, including but not limited to Wi-Fi, LTE, Unlicensed WPAN, WLAN, WWAN, and Wi-Gig. For example, as shown in row 308 of the transaction history block chain 302, the first access attempt may be an attempt to access a Wi-Fi network, the second access attempt may be an attempt to access an LTE network, and the third access attempt may be an attempt to access an unlicensed WPAN network.

The access location in an embodiment may be a GPS location of the client information handling system at the time of access, the GPS location of the mobile edge-compute system granting access, or the access point or cell identification of the mobile edge-compute system granting access. For example, as shown in row 312 of the transaction history block chain 302 in FIG. 3 indicates the client information handling system's first attempt at access was made from a GPS location of 13.7563 degrees by 100.5018 degrees (placing it in Bangkok, Thailand), the second attempt at access was made from a GPS location of 30.2672 degrees by 97.7431 degrees (placing it in Austin, Tex.), and the third attempt at access was made from a GPS location of 39.9042 degrees by 116.4074 degrees (placing it in Beijing, China)

The IMSI used may be stored in an embodiment within a subscriber identity module (SIM) card included within the client information handling system and may remain static for all transaction, or may be assigned to the client information handling system by a local service broker and may vary by transaction. For example, as shown in row 310 of FIG. 3, the IMSI the client information handling system used to access the network in Bangkok was 520030123456789, which includes the mobile country code of 520 associated with Thailand, a mobile network code of 03 associated with Thailand's largest GSM mobile phone operator, Advanced Info Service Public Company Limited, and a mobile subscription identification number 0123456789. As another example, and as also shown in row 310 of FIG. 3, the IMSI the client information handling system used to access the network in Austin was 3101509012345678, which includes the mobile country code of 310 associated with USA, a mobile network code of 150 associated with AT&T Mobility, and a mobile subscription identification number 9012345678. As yet another example, and as also shown in row 310 of FIG. 3, the IMSI the client information handling system used to access the network in Beijing was 460001234567890, which includes the mobile country code of 460 associated with China, a mobile network code of 00 associated with China Mobile Communications Corporation, and a mobile subscription identification number 1234567890.

The transaction history block chain 302 in an embodiment may further record whether a requested access attempt was successful. For example, as shown in row 316 of FIG. 3, the first and third access attempts may have been successful, while the second was not. The transaction history block chain 302 in an embodiment may further record whether payment for a requested access attempt was successful. For example, as shown in row 314 of FIG. 3, payment may have been completed for the first access attempt, but not for the second or third access attempts. Certain historical trust reference points may trigger a security flag to be stored within the transaction history block chain 302 in an embodiment. For example, Access or payment failure, and/or changes in MAC addresses recorded at rows 316, 314, and/or 304, respectively, may prompt recordation of a security flag within row 318 of the transaction history block chain 302. As shown in row 318 of FIG. 3, the second access attempt is associated with a security flag indicating the request came from a MAC address that differs from all other MAC addresses used (which are consistent with one another), and the third access attempt is associated with a security flag indicating the payment for the requested access was unsuccessful.

FIG. 3 in an embodiment may further include information regarding electronic payment for each access attempt. The transaction history block chain 302 in an embodiment may further include a row (not shown) indicating the type of electronic cryptocurrency used to pay for the requested access, if the access was granted. For example, the transaction history block chain 302 may associate each of the first and third attempts with a bitcoin account address. In some embodiments, the bitcoin account address stored in the transaction history block chain may be used to pay for requested services needed to access a wireless communication network, as described in greater detail below.

Figure 4:
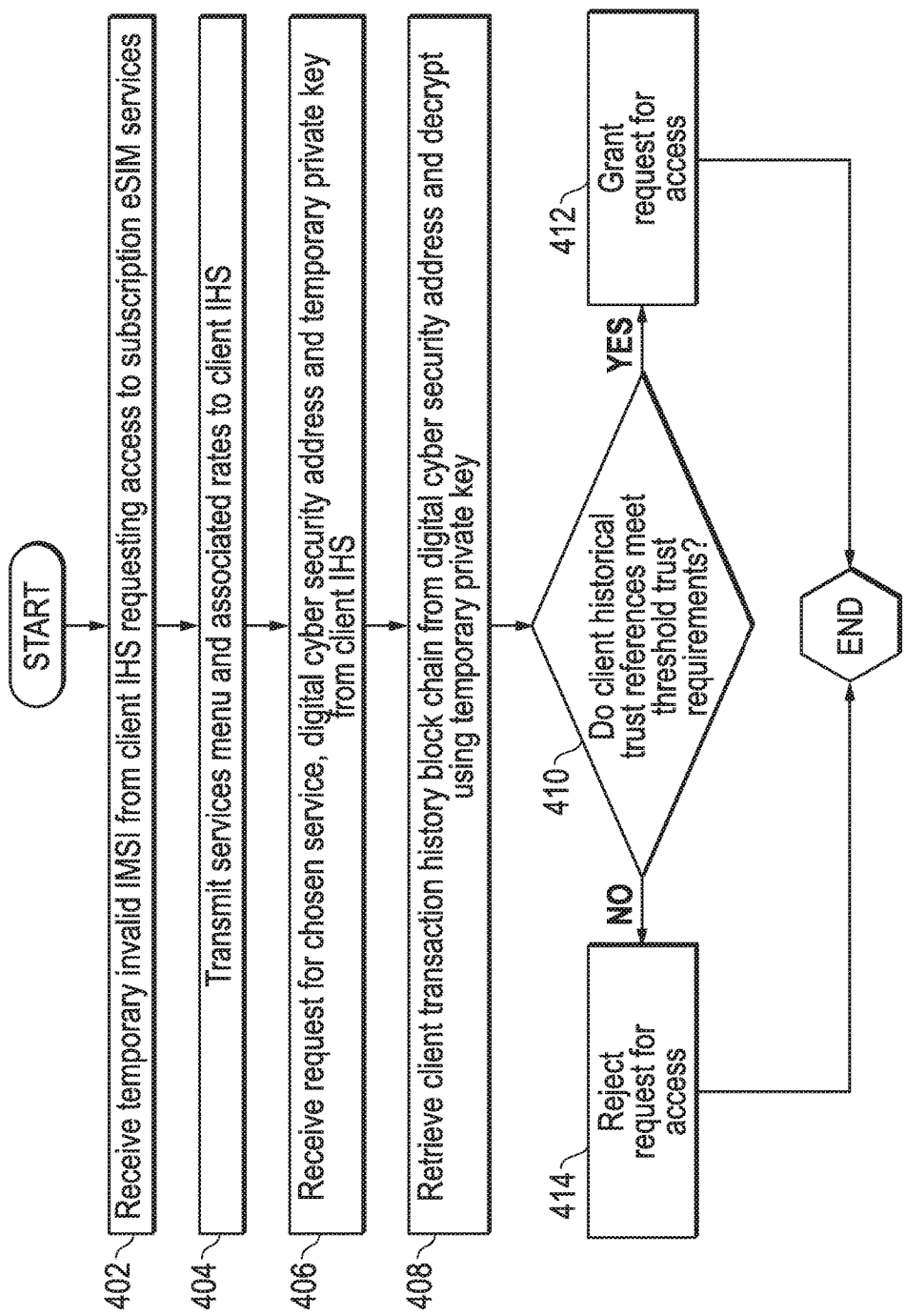
FIG. 4 is a flow diagram illustrating a method of determining whether a client information handling system is a trusted subscriber according to an embodiment of the present disclosure.

FIG. 4 is a flow diagram illustrating a method of determining whether a client information handling system requesting an IMSI and eSIM credentials from a local service broker is a trusted subscriber according to an embodiment of the present disclosure. As described above, a client information handling system that does not incorporate a subscriber identity module (SIM) card may request equivalent electronic SIM (eSIM) credentials and an assigned international mobile subscriber identification (IMSI) from a local service broker within a wireless network for later use accessing the network in embodiments of the present disclosure. At block 402, in an embodiment, the local service broker may receive an invalid IMSI from the client information handling system requesting access to the subscription eSIM services. The subscription eSIM services may include assignment of an IMSI, and generation of one or more variables used to determine valid eSIM credentials. Because the client information handling system does not yet have a valid assigned IMSI, it may transmit an invalid IMSI including a randomly selected number known to be invalid (e.g. having a country code or network code that does not match the known country or network within which the local service broker operates).

At block 404, in an embodiment, the local service broker may transmit a services menu and associated rates to the client information handling system in response to the invalid IMSI. The local service broker in an embodiment may understand receipt of an invalid IMSI as an indication that the client information handling system is in need of a valid IMSI. By supplying the available services and corresponding rates, the local service broker in an embodiment may allow a client information handling system to choose the service that meets the client's needs at an affordable or acceptable rate. A specific invalid IMSI code may be used in some embodiments to trigger a services menu and rates response and allow the request for access to the network to proceed.

At block 406, in an embodiment, the local service broker may receive a request for a service, a digital cyber security address, and a private encryption key from the client information handling system. The service may have been chosen by the client information handling system from the menu of services transmitted to it by the local services broker at block 404. The private encryption key may be a temporary private encryption key in some embodiments.

At block 408, in an embodiment, the local service broker in an embodiment may access an encrypted transaction history block chain at the digital cyber security address and may use the private encryption key to decrypt the transaction history block chain using any encryption method known in the art, including but not limited to symmetric or asymmetric encryption. Once decrypted, the transactional history block chain may include a report of a series of previous compute experiences with respect to the client information handling system. This may include flagged instances of mismatching MAC addresses associated with the information handling system, failure to complete authentication processes, any reported incidents of security breaches or introduction of malware, any reported errors or time out episodes, reported payment problems or fraud, or other significant problems identifiable with access to wireless networks. In one example embodiment, one or more instances of the above type events may place the client information handling system in an untrustworthy category. No reported events such as the above may place the client information handling system in a trustworthy category. In another embodiment, the eSIM credential provisioning and verification system may create a trustworthiness rating from the historical trust references records for comparison to trust references of other client information handling systems through application of any algorithm to assess performance of the client information handling system. In some embodiments, the transaction history block chain may further include past payment history, including the account address for a cryptocurrency used to pay for services (e.g. bitcoin address).

At block 410, in an embodiment, the local service broker node executing instructions of the eSIM credential provisioning and verification system may determine whether the transaction history meets a threshold trust requirement. Once the local service broker has accessed and possibly decrypted the transaction history block chain, the eSIM credential provisioning and verification system operating at the local service broker may then determine whether the assessed trustworthiness of the client information handling system meets a minimal trust level. As an example, a threshold trust requirement may be a complete lack of instances of mismatching MAC addresses assigned to the client information handling system, failure to complete authentication processes, any reported incidents of security breaches or introduction of malware, any reported errors or time out episodes, reported payment problems or fraud, or other significant problems identifiable with access to wireless networks. Other example threshold trust requirements may include a lack of any of the above instances within a recent time period (e.g. one month, six months, one year). If the client historical trust references meet a threshold trust requirement, the method may proceed to block 412. If the client historical trust references do not meet a threshold trust requirement, the method may proceed to block 414.

At block 412, the local service broker may grant the request for the chosen service if the threshold trust requirement is met. If the eSIM credential provisioning and verification system operating at the local service broker in an embodiment determines the client historical trust references meet the threshold trust requirement, this may indicate the client information handling system is who it claims to be (MAC addresses match), and that the client is trustworthy to pay for the requested services, and not to introduce malware, violate security of other information handling systems accessing the network, or cause other types of harm to the network hardware, software, or infrastructure. As a consequence, the eSIM credential provisioning and verification system operating at the local service broker may grant the request for the specific service received from the client information handling system at block 406.

At block 414, the local service broker may deny the request for the chosen service, if the threshold trust requirement is not met. If the eSIM credential provisioning and verification system operating at the local service broker in an embodiment determines the client historical trust references do not meet the threshold trust requirement, this may indicate the client information handling system is not who it claims to be (MAC addresses do not match one another), the client is not trustworthy to pay for the requested services, and/or may be likely to introduce malware, violate security of other information handling systems accessing the network, or cause other types of harm to the network hardware, software, or infrastructure, or the client has been denied access to enterprise or roaming networks in the past due to insufficient trust. As a consequence, the eSIM credential provisioning and verification system operating at the local service broker may deny the request for the specific service received from the client information handling system at block 406.

Figure 5:
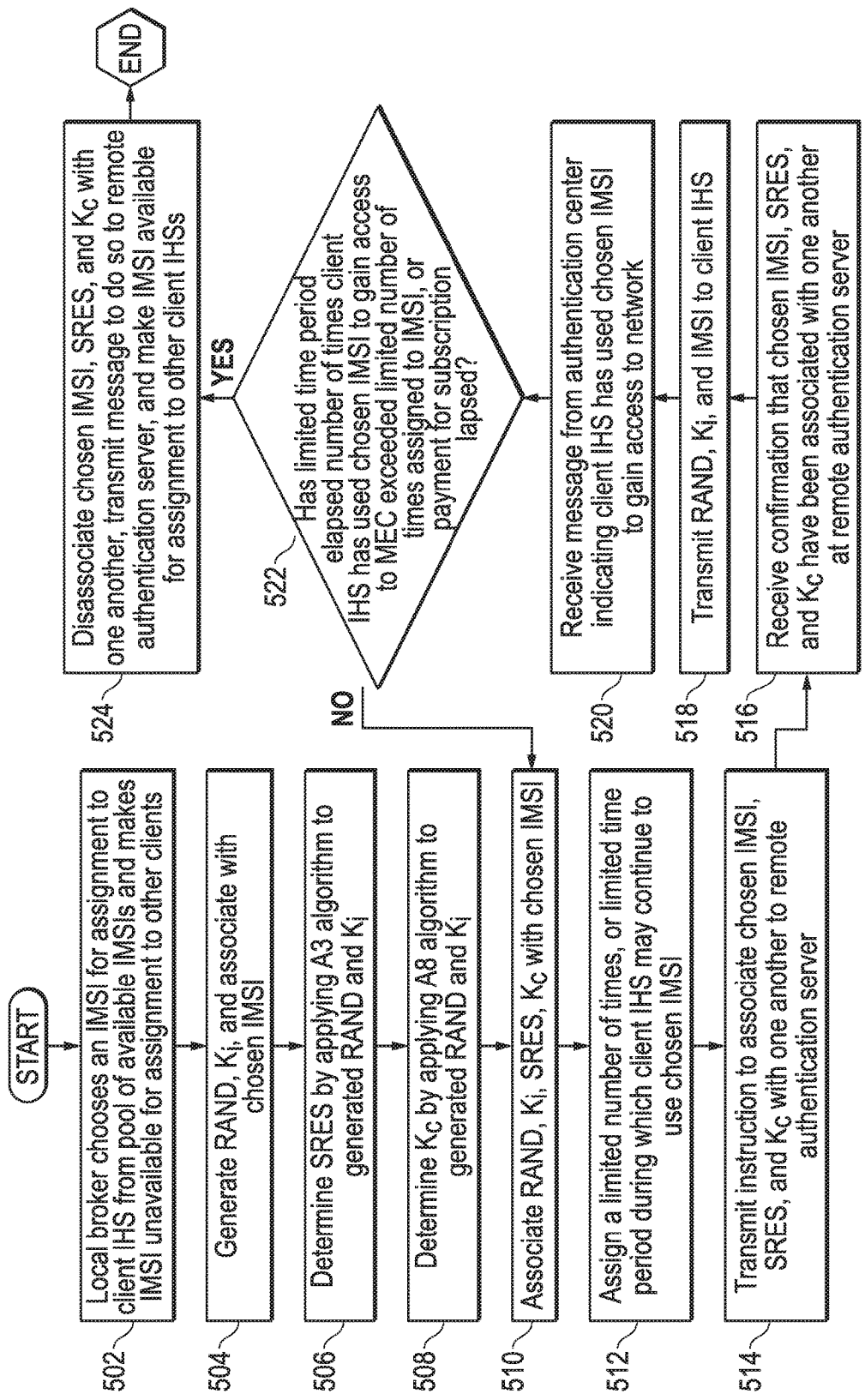
FIG. 5 is a flow diagram illustrating a method of provisioning a client information handling system with eSIM credentials according to an embodiment of the present disclosure.

FIG. 5 is a flow diagram illustrating a method of provisioning a client information handling system lacking a SIM card and requesting access to a network requiring SIM credentials with eSIM credentials according to an embodiment of the present disclosure. As described above, cellular communication infrastructures, such as 2G, 3G, 4G, 5G, Wi-Max, and LTE require information handling systems communicating according to these standards to include a subscriber identity module (SIM) card, allowing an authentication server within each wireless network to track identification of each device accessing the cellular network, as required by United States Copyright laws, in order to avoid penalties for misuse of the internet. Cellular information handling systems (e.g. smart phones) incorporate SIM cards storing a unique international mobile subscriber identification (IMSI) for the client information handling system and one or more SIM credentials in the manufacturing stage of the device, but other information handling systems within a client's ecosystem of devices may not include a SIM card upon manufacture and sale of the device (e.g. laptop computers, tablet computers, IoT sensors). The eSIM credential provisioning and verification system in embodiments of the present disclosure may provide the IMSI and electronic SIM (eSIM) credentials equivalent to the SIM credentials required by wireless networks to client information handling systems not incorporating SIM cards.

The eSIM credential provisioning and verification system in embodiments of the present disclosure may operate partially onboard each client information handling system, within a local servicing broker operating at a mobile edge-compute system (MEC), and/or within an authentication server (e.g. home subscriber server) located remotely from the client information handling system and the local service broker. For example, at block 502, in an embodiment the eSIM credential provisioning and verification system operating at a local service broker may choose an IMSI for assignment to a trustworthy client information handling system from a pool of available IMSIs and make the chosen IMSI unavailable for assignment to other clients. A local service broker in embodiments of the present disclosure may have access to a pool of available international mobile subscriber identities (IMSI) that may be checked out and assigned to paying subscriber client information handling systems in order to provide the identification required by copyright laws. Upon determining a client information handling system requesting services is trustworthy, as described above with reference to FIG. 4, the local service broker in an embodiment may choose one of the IMSIs from the pool of available IMSI's, associate that IMSI with the media access control (MAC) address of the client information handling system, and make that IMSI unavailable for assignment to another client information handling system.

At block 504, in an embodiment, the local service broker may generate the variables RAND, $K_i$, and associate these variables with the chosen IMSI assigned to the client information handling system. In information handling systems containing a SIM card, the variables RAND and $K_i$ would be stored on the SIM card and used to generate further SIM credentials. In embodiments of this disclosure, the local service broker generates these values since the client information handling system may not include a SIM card. The RAND variable in an embodiment may be a 128 bit random challenge variable. The $K_i$ variable in an embodiment may be a 128 bit individual subscriber authentication key.

At block 506, in an embodiment, the local service broker may determine the value of eSIM credential SRES for the client information handling system. The eSIM credential SRES in an embodiment may be a 32 bit signed response. In an embodiment, SRES may be determined by applying an A3 algorithm defined in the GSM standard to the concatenation of the variables $K_i$ and RAND, generated at block 504 above. At block 508, in an embodiment, the local service broker may determine the value of eSIM credential $K_C$ for the client information handling system. The eSIM credential $K_C$ in an embodiment may be a 64 bit ciphering key used as a session key. In an embodiment, $K_C$ may be determined by applying an A8 algorithm defined in the GSM standard to the concatenation of the variables $K_i$ and RAND, generated at block 504 above. It is understood the eSIM credential provisioning and verification system in an embodiment may apply any algorithm included in the GSM standard, or any other known algorithm used in the art to the concatenation of RAND and $K_i$ to generate the values SRES and $K_C$, and that the A3 and A8 algorithms provide only two possible examples of such algorithms.

At block 510, in an embodiment, the local services broker may associate the generated variables RAND and $K_i$, as well as the eSIM credentials SRES and $K_C$ with the IMSI chosen from the pool of available IMSIs for assignment to the client information handling system requesting services. In an embodiment, the client information handling system may be capable of accessing wireless networks using this IMSI and associated eSIM credentials as long as the client information handling system is associated with the chosen IMSI. At block 512, in an embodiment, the eSIM credential provisioning and verification system operating at the local service broker may assign a limited number of times, or a limited time period during which the client information handling system may continue to use the chosen IMSI. In an embodiment, the local service broker may only allow the client information handling system to use the assigned IMSI and associated eSIM credentials to access wireless networks a set number of times, or for a set duration until further payment is requested from the client information handling system. For example, the eSIM credential provisioning and verification system may assign a limit (e.g. once, three times, ten times, one hundred times) to the number of times the chosen IMSI and associated eSIM credentials may be used by the client information handling system to access wireless networks. As another example, the eSIM credential provisioning and verification system may assign a time limit (e.g. one hour, one day, one week, one month) for the client information handling system's use of the chosen IMSI and associated eSIM credentials to access wireless networks. As yet another example, the eSIM credential provisioning and verification system may automatically revoke a client information handling system's ability to use the chosen IMSI upon a lapse or missed scheduled payment by the client information handling system for subscription services.

At block 514, in an embodiment, the local service broker may transmit the chosen IMSI, SRES, $K_C$, and an instruction to associate the chosen IMSI with the transmitted SRES and $K_C$ to an authentication server within a wireless network. As described above, the eSIM credential provisioning and verification system in embodiments of the present disclosure may operate partially within an authentication server (e.g. home subscriber server) located remotely from the client information handling system and the local service broker. The authentication server in an embodiment may operate to track the identities of each client information handling system accessing a wireless network in adherence of U.S. Copyright Laws.

At block 516, in an embodiment, the local service broker may receive confirmation from the authentication server that the chosen IMSI, SRES, and $K_C$ have been associated with one another. Upon receipt of the chosen IMSI, SRES, $K_C$, and instruction to associate the chosen IMSI with the transmitted SRES and $K_C$ from the local service broker as described at block 514, the authentication server may execute the received instruction and transmit a confirmation of completion. Once the authentication server successfully stores an association of the chosen IMSI with the SRES and $K_C$ transmitted from the local service broker at block 514, a client information handling system submitting these same values may be verified as a trusted subscriber to the network.

At block 518, in an embodiment, the eSIM credential provisioning and verification system operating at the local service broker may transmit the chosen IMSI, determined RAND and $K_i$ to the client information handling system. The client information handling system may use these received values to determine the eSIM credentials SRES and $K_C$ using the same methods used by the local service broker, and may then use these eSIM credentials to prove it is a trusted, valid subscriber to the network at a later time. Upon transmission of these variables and IMSI to the client information handling system, the local service broker in some embodiments may automatically charge for the requested and agreed services using the cryptocurrency account stored within the client information handling system's transaction history block chain.

At block 520, in an embodiment, the local service broker executing instructions of the eSIM credential provisioning and verification system may receive a message from the authentication server indicating the client information handling system has used the chosen IMSI to gain access to either the enterprise network or a roaming network. As described above, the client information handling system may make four different types of access attempts: (1) access the enterprise network via the local service broker; (2) access the enterprise network via the authentication server; (3) access a roaming network via the authentication server; and (4) access a roaming network via a mobile edge-compute system (MEC) operating within the roaming network. After receiving the IMSI, the client information handling system may request access in the second and third of these types of attempts by presenting the IMSI and determined SRES and $K_C$ directly to the authentication server. The client information handling system may request access in the fourth of these types of attempts by presenting the IMSI and determined SRES and $K_C$ to the MEC in the roaming network, which may then forward it onto the authentication server. Thus, in all but the first type of access described above, the authentication server ultimately receives IMSI and determined SRES and $K_C$ either directly or indirectly from the client information handling system. If the authentication server in an embodiment receives the IMSI, SRES, and $K_C$, and determines these variables belong to a trusted, paying subscriber, it may further transmit a message to the local service broker indicating the IMSI it received for verification has been used to access the network, and may further indicate the duration of that access. In an embodiment in which the client information handling system attempts to access the enterprise network via the local service broker directly, block 520 may not occur.

At block 522, in an embodiment, the eSIM credential provisioning and verification system operating at the local service broker may determine whether payment for subscription services has lapsed, the limited time period has elapsed, or the number of times the client information handling system has used the chosen IMSI to gain access to the MEC has exceeded the limited number of times assigned to the IMSI. As described above with reference to block 512, the local service broker may only allow the client information handling system to use the assigned IMSI and associated eSIM credentials to access wireless networks a set number of times, or for a set duration until further payment is requested from the client information handling system. As also described above with reference to block 512, the eSIM credential provisioning and verification system may automatically revoke a client information handling system's ability to use the chosen IMSI upon a lapse or missed scheduled payment by the client information handling system for subscription services. For example, in an embodiment where the client allows for scheduled charges to be made to a cryptocurrency account (e.g. bitcoin) whose location is stored in the client information handling system's transaction history block chain, and one of the charges fails to go through, the eSIM credential provisioning and verification system may automatically revoke a client information handling system's ability to use the chosen IMSI.

For example, the eSIM credential provisioning and verification system may determine at block 522 that the client information handling system has not yet used the assigned IMSI the assigned limit of ten times to access wireless networks. If the local service broker determines the limited time period has not elapsed or the number of the times the client information handling system has used the chosen IMSI to gain access to the network has not exceeded the limited number of times assigned to the IMSI, the method may return to block 510, and the IMSI may continue to be assigned to the client information handling system.

As another example, the eSIM credential provisioning and verification system may determine the assigned time limit of one day for the client information handling system's use of the chosen IMSI and associated eSIM credentials to access wireless networks has elapsed. If the local service broker determines the limited time period has elapsed or the number of the times the client information handling system has used the chosen IMSI to gain access to the network has exceeded the limited number of times assigned to the IMSI, the method may proceed to block 524.

At block 524, in an embodiment, the eSIM credential provisioning and verification system operating at the local service broker may disassociate the chosen IMSI, SRES, and $K_C$ with one another, and with the client information handling system's MAC address. By disassociating the chosen IMSI from the client information handling system's MAC address, the local service broker may make the IMSI available for reassignment to another client information handling system. The local service broker may further transmit a message to the authentication server instructing it to disassociate the IMSI from the eSIM credentials SRES and $K_C$ within the authentication server storage. By disassociating the chosen IMSI from the SRES and $K_C$ determined by the client information handling system, the local service broker may bar the client information handling system or any other information handling system in possession of the association between the IMSI, SRES, and $K_C$ from using these credentials to access the network again. In such a way the eSIM credential provisioning and verification system in embodiments of the present disclosure may provide valid eSIM credentials to information handling systems not incorporating SIM cards, allowing these information handling systems to access networks requiring SIM identification credentials, without adding additional components to the information handling system.

Figure 6:
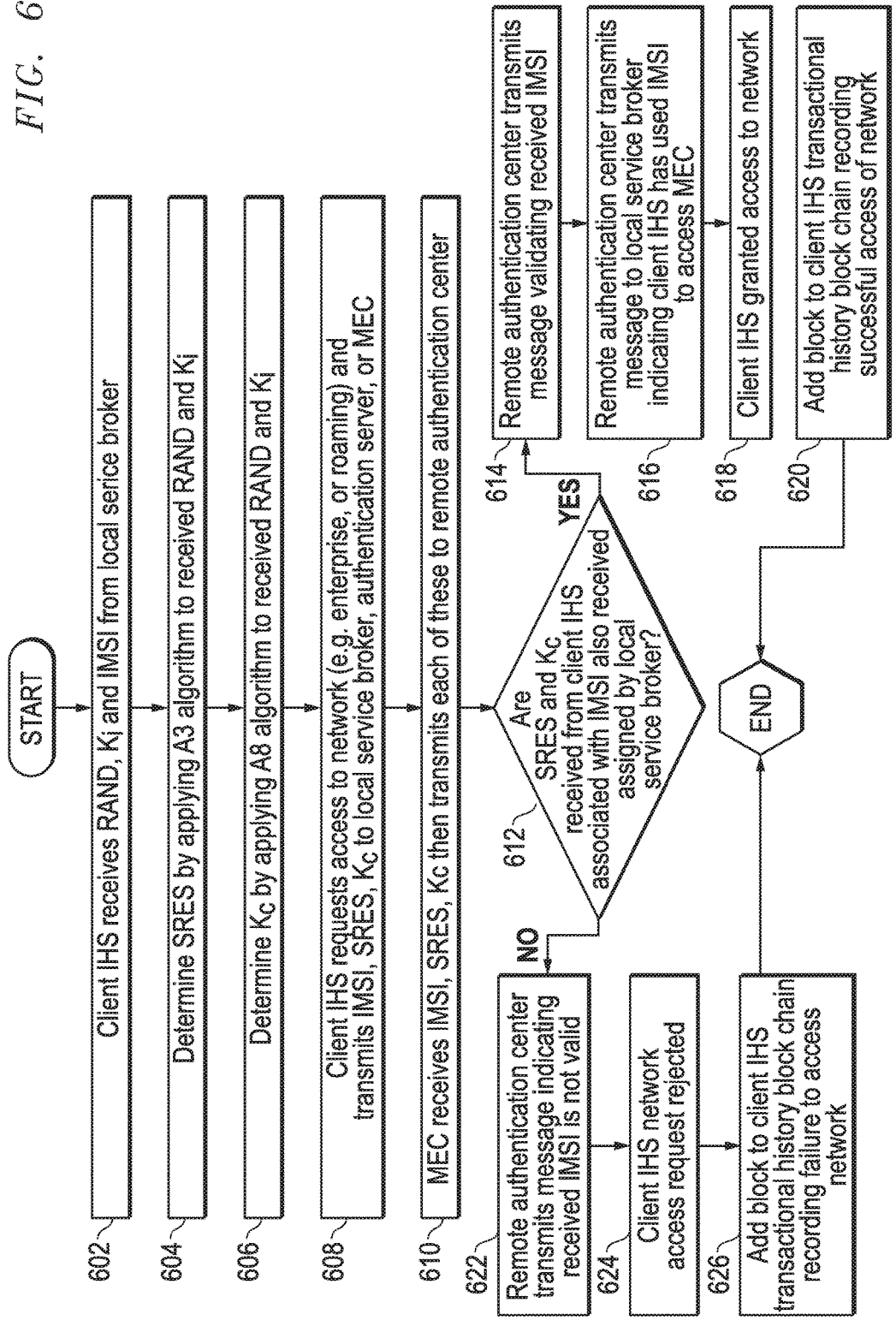
FIG. 6 is a flow diagram illustrating a method of verifying eSIM credentials for a client information handling system according to embodiments of the present disclosure.

FIG. 6 is a flow diagram illustrating a method of verifying eSIM credentials provided from a local service broker to a client information handling system according to embodiments of the present disclosure. As described above, the client information handling system may make four different types of access attempts: (1) access the enterprise network via the local service broker; (2) access the enterprise network via the authentication server; (3) access a roaming network via the authentication server; and (4) access a roaming network via a mobile edge-compute system (MEC) operating within the roaming network. FIG. 6 illustrates all steps involved in each of these scenarios, but some of the blocks shown in FIG. 6 apply to only some of these scenarios, as described in greater detail below.

At block 602, in an embodiment, the client information handling system may receive an international mobile subscriber identification (IMSI), a variable RAND, and a variable $K_i$ from a local service broker. As described above, electronic SIM (eSIM) modules in embodiments of the present disclosure may operate onboard client information handling systems not including subscriber identity modules (SIM) cards, and may operate to generate eSIM credentials based on variables received from a local service broker operating at an access point within a cellular network. These eSIM modules may take the form of an API or agent for an eSIM credential provisioning and verification system in embodiments of the present disclosure. The eSIM credential provisioning and verification system in embodiments of the present disclosure may further operate, in part, on a local service broker, and/or a remote authentication server. For example, as described above, the eSIM credential provisioning and verification system operating at a local service broker may transmit and the API or agent for the eSIM credential provisioning and verification system operating at the client information handling system may receive an IMSI, a RAND variable, and a $K_i$ variable.

As described above, the authentication server functioning to track identification of verified subscribers to the wireless network may have stored an association of the chosen IMSI with the SRES and $K_C$. As also described above, a client information handling system submitting these same values may be verified as a trusted subscriber to the network. In an embodiment, the client information handling system in receipt of the values RAND and $K_i$ may use these received values to determine the eSIM credentials SRES and $K_C$ using the same methods used by the local service broker, and may then use these eSIM credentials to prove it is a trusted, valid subscriber to the network. At block 604, in an embodiment, the client information handling system may determine the eSIM credential SRES. In an embodiment, SRES may be determined by applying an A3 algorithm defined in the GSM standard to the concatenation of the variables $K_i$ and RAND, received by the client information handling system at block 602 above. At block 606, in an embodiment, the client information handling system may determine the value of eSIM credential $K_C$. In an embodiment, $K_C$ may be determined by applying an A8 algorithm defined in the GSM standard to the concatenation of the variables $K_i$ and RAND, received by the client information handling system at block 602 above. It is understood the eSIM credential provisioning and verification system in an embodiment may apply any algorithm included in the GSM standard, or any other known algorithm used in the art to the concatenation of RAND and $K_i$ to generate the values SRES and $K_C$, and that the A3 and A8 algorithms provide only two possible examples of such algorithms.

At block 608, in an embodiment, the client information handling system may request access to a network via a local service broker, the authentication server, or a MEC operating within a roaming network. In requesting access via any of these pathways, the client information handling system in an embodiment may transmit the IMSI it received from the local service broker at block 602, as well as the SRES, and $K_C$ eSIM credentials it determined at blocks 604 and 606, respectively to either the local service broker, the authentication server, or the MEC of the roaming network (whichever one of them the client information handling system is requesting access from).

In an embodiment in which the client information handling system is attempting to access a roaming network via a MEC within the roaming network, the MEC may need to communicate with the authentication server to verify the client information handling system. For example, at block 610, in an embodiment, the mobile edge-compute (MEC) system operating within the roaming network may receive the IMSI, SRES, and $K_C$ variables from the client information handling system, then transmit these values on to the authentication system for verification of the client information handling system. As described above with reference to blocks 514 and 516 in FIG. 5, the local service broker in an embodiment may have previously determined the values SRES and $K_C$ and the authentication server may have stored these values in association with the IMSI assigned to the client information handling system. It is understood block 610 may not be necessary in scenarios in which the client information handling system attempts to access a network via the local service broker or directly via the authentication server.

As shown in FIG. 6, at block 612, in an embodiment, the authentication server or local service broker may determine whether the eSIM credentials received from the client information handling system match the eSIM credentials assigned by the local service broker. The local service broker may compare received and stored eSIM credentials in an embodiment in which the client information handling system attempts to access the enterprise network directly via the local service broker. For example, the local service broker may locate the variables SRES and $K_C$ associated with the IMSI received from the client information handling system (as described above at block 608) to the SRES and $K_C$ associated with the IMSI received from the client information handling system within storage at the local service broker.

The authentication server may compare received and stored eSIM credentials an embodiment in which the client information handling system attempts to access either an enterprise network or a roaming network directly via the authentication server, or in which the client information handling system attempts to access a roaming network via a MEC which then transmits the IMSI, SRES, and $K_C$ it received from the client information handling system to the authentication server (as described above with reference to block 610). For example, the authentication server may locate the variables SRES and $K_C$ associated with the IMSI received from the client information handling system (as shown above at block 608) within storage at the authentication server. The authentication server in an embodiment may then compare these located and stored values for SRES and $K_C$ and compare them to the values for SRES and $K_C$ received from the client information handling system, either directly or via the MEC.

If the client information handling system attempts to gain access to the network using an IMSI that is not currently assigned, the client information handling system uses a RAND and/or $K_i$ value not matching the values the local service broker associated with the IMSI to determine the SRES and $K_C$ values, and/or the client information handling system uses the wrong algorithms (e.g. algorithms other than the A3 and A8 algorithms defined by the GSM specification) to determine the values of SRES and $K_C$ based on the concatenation of $K_i$ and RAND, the eSIM credentials submitted by the client information handling system may not match the eSIM credentials stored at the authentication server or at the local service broker. If the eSIM credentials match, the method may proceed to block 614. If the eSIM credentials do not match, the method may proceed to block 622.

At block 614, in an embodiment, the remote authentication server may transmit a message validating the received IMSI to the MEC. If the eSIM credentials submitted by the MEC (as received from the client information handling system) match the eSIM credentials stored at the authentication server (as received from the local service broker), this indicates the client information handling system is a verified, trusted subscriber of the network. Consequently, the authentication server in an embodiment may transmit a message validating the client information handling system to the MEC. It is understood this block 614 may not occur in an embodiment in which the client information handling system attempts to access a network via the local service broker or via the authentication server.

At block 616, in an embodiment, the authentication server may transmit a message to the local service broker indicating the client information handling system has used the IMSI to access the network. As described above, the eSIM credential provisioning and verification system operating at the local service broker may assign a limited number of times, or a limited time period during which the client information handling system may continue to use the chosen IMSI. In an embodiment, the local service broker may only allow the client information handling system to use the assigned IMSI and associated eSIM credentials to access wireless a set number of times, or for a set duration until further payment is requested from the client information handling system. By transmitting a message to the local service broker indicating the client information handling system has used the IMSI to access the network in an embodiment, the authentication server allows the local service broker to keep an accurate count of the number of times or elapsed time in which the client has used the IMSI. It is understood this block 616 may not occur in embodiments in which the client information handling system attempts to access the network directly via the local service broker.

At block 618, in an embodiment, the client information handling system may be granted access to the network. In embodiments in which the client information handling system requests access to the network via the local service broker, the local service broker may grant access to the network. In embodiments in which the client information handling system requests access to the network via the authentication server, the authentication server may grant access to the network.

In embodiments in which the client information handling system requests access via a MEC, block 618 may further include the MEC receiving a verification of the IMSI and eSIM credentials from the authentication server. Verification of the IMSI and eSIM credentials supplied by the client information handling system in an embodiment is an indication that the client information handling system is a verified paying subscriber who is trustworthy to pay for the requested services, and not to introduce malware, violate security of other information handling systems accessing the network, or cause other types of harm to the network hardware, software, or infrastructure. As a consequence, the eSIM credential provisioning and verification system operating at the MEC may grant the requested access to the network.

At block 620, in an embodiment, the transaction history block chain for the client information handling system may be updated to reflect successful access to the network by the client information handling system. As described above, the transaction history block chain associated with the client information handling system is a distributed database of time-stamped records called "blocks," where each block describes an attempt by the client information handling system to access a network and each block is linked to the other blocks to form a chain. Each block in a block chain may be added by a different entity or device simply by linking a new block to previously recorded blocks, making retroactive alteration of an early block impossible without alteration of all of the subsequent blocks that later followed and linked to that early block, and making transmission and authentication of data between a plurality of devices quicker, cheaper, and safer than traditional non-distributed systems with a central authentication server that may be hacked. As also described above, the eSIM credential provisioning and verification system operating at the local service broker relies on accurate and current transaction histories to determine whether to allow client information handling systems access to eSIM credentials. By updating the transaction history block chain for the client information handling system each time a transaction request takes place and is concluded, the entity through which the client information handling system requested access assists local service brokers to adjudge the trustworthiness of client information handling systems accurately.

For example, at block 620, in an embodiment in which the local service broker grants access to the client information handling system, the local service broker may update the transaction history block chain with a block indicating the client information handling system was granted access to the network, possibly increasing the trustworthiness of the client information handling system. As another example, at block 620, in an embodiment in which the authentication server grants access to the client information handling system, the authentication server may update the transaction history block chain with a block indicating the client information handling system was granted access to the network, possibly increasing the trustworthiness of the client information handling system. As yet another example, at block 620, in an embodiment in which the MEC grants access to the client information handling system, the MEC may update the transaction history block chain with a block indicating the client information handling system was granted access to the network, possibly increasing the trustworthiness of the client information handling system.

At block 622, in an embodiment in which the client information handling system has requested access via a MEC and the credentials do not match, the remote authentication server may transmit a message indicating the received IMSI is not valid. If the eSIM credentials submitted by the client information handling system at block 608 via the MEC do not match the eSIM credentials stored at the authentication server (as received from the local service broker), the remote authentication server may transmit a message indicating a lack of verification of the requesting client information handling system. Block 622 may not occur in embodiments in which the client information handling system requests access to the network via the local service broker or via the authentication server.

At block 624, access to the network may be denied. In an embodiment in which the client information handling system requests access via the local service broker, the local service broker may deny the client information handling system's request for access to the network. In an embodiment in which the client information handling system requests access via the authentication server, the authentication server may deny the client information handling system's request for access to the network.

In embodiments in which the client information handling system requests access via a MEC, block 624 may further include the MEC receiving an indication from the authentication server that the client information handling system could not be verified. A lack of verification of the IMSI and eSIM credentials supplied by the client information handling system in an embodiment is an indication that the client information handling system is not a verified paying subscriber and/or is not trustworthy to pay for the requested services, and/or may be likely to introduce malware, violate security of other information handling systems accessing the network, or cause other types of harm to the network hardware, software, or infrastructure. As a consequence, the eSIM credential provisioning and verification system operating at the MEC may deny the request for access to the network.

At block 626, in an embodiment, the transaction history block chain for the client information handling system may be updated to reflect an unsuccessful attempt to access the network by the client information handling system. As described above, by updating the transaction history block chain for the client information handling system each time a transaction request takes place and is concluded, the entity through which the client information handling system requested access assists local service brokers to adjudge the trustworthiness of client information handling systems accurately. For example, at block 626, in an embodiment in which the local service broker denies access to the client information handling system, the local service broker may update the transaction history block chain with a block indicating the client information handling system was denied access to the network, possibly decreasing the trustworthiness of the client information handling system. As another example, at block 626, in an embodiment in which the authentication server denies access to the client information handling system, the authentication server may update the transaction history block chain with a block indicating the client information handling system was denied access to the network, possibly decreasing the trustworthiness of the client information handling system. As yet another example, at block 626, in an embodiment in which the MEC denies access to the client information handling system, the MEC may update the transaction history block chain with a block indicating the client information handling system was denied access to the network, possibly decreasing the trustworthiness of the client information handling system.

The blocks of the flow diagrams of FIGS. 4-6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system of a local service broker system operating a subscription electronic SIM assignment system comprising:
    a memory storing a pool of international mobile subscriber identities for assignment to requesting clients;
    a network interface device for communication with an authentication server in a wireless communication network;
    a processor executing machine readable executable code instructions to:
        receive a transaction history associated with a client information handling system; and
        if the transaction history meets a threshold trust requirement, assign one of the pool of international mobile subscriber identities to the client information handling system, generate variables not unique to the client information handling system for determination of electronic SIM credentials, determine one or more electronic SIM credentials based on generated variables for determination of electronic SIM credentials, and transmit the assigned international mobile subscriber identity and variables for determination of electronic SIM credentials to the client information handling system.

2. The information handling system operating the system of claim 1 further comprising:
    the processor executing machine readable executable code instructions to:
        transmit the assigned international mobile subscriber identity and electronic SIM credentials to the remote authentication server; and
        transmit an instruction to the remote authentication server to store in memory an association between the assigned international mobile subscriber identity and electronic SIM credentials.

3. The information handling system operating the system of claim 1 further comprising:
    the processor executing machine readable executable code instructions to:
        determine a limit associated with the assigned international mobile subscriber identification wherein the limit may be a limited period of time for wireless access;
        determine whether the limit has been reached; and
        if the limit has been reached, transmit an instruction to the authentication server to disassociate the assigned international mobile subscriber identity from the electronic SIM credentials.

4. The information handling system operating the system of claim 1, wherein the local service broker is co-located with a mobile edge-compute system acting as an access point within the wireless communication network.

5. The information handling system operating the system of claim 1 further comprising:
    a processor executing machine readable executable code instructions to:
        receive a temporary private encryption key from the client information handling system;
        decrypt the received transaction history from an encrypted block chain using the temporary private encryption key.

6. The information handling system operating the system of claim 1, wherein the transaction history identifies a cryptocurrency account address.

7. The information handling system operating the system of claim 1, wherein the transaction history is updated to reflect when a successful attempt to access the wireless communication network occurred.

8. A method for provisioning electronic SIM credentials comprising:
    receiving at a local service broker a request to access a wireless communication network including the local service broker and an authentication server;
    receiving a transaction history associated with a client information handling system; and
    if the transaction history meets a threshold trust requirement, assigning one of a pool of international mobile subscriber identities available for assignment to clients to the client information handling system, generating variables not unique to the client information handling system for determination of electronic SIM credentials, determining one or more electronic SIM credentials based on generated variables for determination of electronic SIM credentials, and transmitting the assigned international mobile subscriber identity and variables for determination of electronic SIM credentials to the client information handling system.

9. The method for provisioning electronic SIM credentials of claim 8 further comprising:
    transmitting the assigned international mobile subscriber identity and electronic SIM credentials to the remote authentication server; and
    transmitting an instruction to the remote authentication server to store in memory an association between the assigned international mobile subscriber identity and electronic SIM credentials.

10. The method for provisioning electronic SIM credentials of claim 8 further comprising:
    determining the client information handling system is associated with a lapsed payment; and
    transmitting an instruction to the authentication server to disassociate the assigned international mobile subscriber identity from the electronic SIM credentials.

11. The method for provisioning electronic SIM credentials of claim 8, further comprising:
    identifying a cryptocurrency account address within the transaction history;
    receiving a request to pay for the granted request to access the wireless communication network using the cryptocurrency account address; and
    charging the cryptocurrency account address for the granted request to access the wireless communication network.

12. The method for provisioning electronic SIM credentials of claim 8, further comprising:
    receiving a temporary private encryption key from the client information handling system; and
    decrypting the transaction history from an encrypted block chain using the temporary private encryption key.

13. The method for provisioning electronic SIM credentials of claim 8 further comprising:
receiving a client international mobile subscriber identification and client electronic SIM credentials from the client information handling system;
locating a stored international mobile subscriber identification matching the client international mobile subscriber identification in the memory of the local service broker; and
if the stored international mobile subscriber identification is associated with stored electronic SIM credentials matching the received client electronic SIM credentials in the memory of the local service broker, granting the request to access the wireless communication network.

14. The method for provisioning electronic SIM credentials of claim 13, further comprising:
updating the transaction history to reflect a successful attempt to access the wireless communication network.

15. An information handling system of a local service broker operating a subscription electronic SIM assignment system comprising:
a memory storing an international mobile subscriber identity and an associated electronic SIM credential;
a processor executing machine readable executable code instructions to:
receive a request to access a wireless communication network, a client international mobile subscriber identification, and an electronic SIM credential from a client information handling system;
identify the stored international mobile subscriber identity in the memory matching the received client international mobile subscriber identification;
identify the stored electronic SIM credential associated with the stored international mobile subscriber identity in the memory;
wherein the stored electronic SIM credential was determined based on variables not unique to the client information handling system generated for determination of electronic SIM credentials; and
if the received client electronic SIM credential matches the stored electronic SIM credential, grant the client information handling system access to the wireless communication network.

16. The information handling system operating the system of claim 15, further comprising:
the processor executing machine readable executable code instructions to:
deny the client information handling system access to the wireless communication network if the received client electronic SIM credential does not match the stored electronic SIM credential.

17. The information handling system operating the system of claim 16, further comprising:
updating the transaction history to reflect an unsuccessful attempt to access the wireless communication network.

18. The information handling system operating the system of claim 15, further comprising:
the processor executing machine readable executable code instructions to:
determine a limit associated with the stored international mobile subscriber identification wherein the limit may be a limited period of time for wireless access;
determine whether the limit has been reached; and
if the limit has been reached, disassociate the stored international mobile subscriber identity from the stored electronic SIM credential in the memory.

19. The information handling system operating the system of claim 15, further comprising:
the processor executing machine readable executable code instructions to:
receive a request to cyclically charge for services rendered to a cryptocurrency account from the client information handling system;
determine a failure to charge the cryptocurrency account has occurred; and
disassociate the stored international mobile subscriber identity from the stored electronic SIM credential in the memory.

20. The information handling system operating the system of claim 19, wherein the cryptocurrency account is identified in a transaction history block chain associated with the client information handling system.

* * * * *